United States Patent
Yokose

(10) Patent No.: US 7,158,683 B2
(45) Date of Patent: Jan. 2, 2007

(54) IMAGE PROCESSING DEVICE

(75) Inventor: Taro Yokose, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 685 days.

(21) Appl. No.: 10/376,608

(22) Filed: Mar. 3, 2003

(65) Prior Publication Data

US 2003/0219161 A1 Nov. 27, 2003

(30) Foreign Application Priority Data

May 23, 2002 (JP) .............................. 2002-149220

(51) Int. Cl.
*G06K 9/36* (2006.01)
*G06K 9/00* (2006.01)

(52) U.S. Cl. .................................. 382/245

(58) Field of Classification Search ................ 382/173, 382/176, 232, 233, 234, 239, 243, 250, 251, 382/245; 341/51; 375/240.03, 240.04, 240.1, 375/240.2, 240.24
See application file for complete search history.

(56) References Cited

U.S. PATENT DOCUMENTS

| | | | | |
|---|---|---|---|---|
| 4,803,735 A | * | 2/1989 | Nishida et al. | ............ 382/151 |
| 5,455,680 A | * | 10/1995 | Shin | ............ 382/239 |
| 5,883,672 A | * | 3/1999 | Suzuki et al. | ........ 375/240.04 |
| 6,236,755 B1 | * | 5/2001 | Kashiwazaki | ............ 382/239 |
| 6,597,815 B1 | * | 7/2003 | Satoh et al. | ............ 382/251 |
| 6,657,564 B1 | * | 12/2003 | Malik | ............ 341/51 |
| 6,697,525 B1 | * | 2/2004 | Sadeh | ............ 382/232 |
| 6,731,814 B1 | * | 5/2004 | Zeck et al. | ............ 382/239 |
| 6,804,401 B1 | * | 10/2004 | Nelson et al. | ............ 382/239 |
| 6,898,313 B1 | * | 5/2005 | Li et al. | ............ 382/176 |
| 2003/0219161 A1 | * | 11/2003 | Yokose | ............ 382/239 |

FOREIGN PATENT DOCUMENTS

| | | |
|---|---|---|
| JP | A 7-236062 | 9/1995 |
| JP | A 11-168633 | 6/1999 |

OTHER PUBLICATIONS

Japanese Office Action drafted on Jul. 25, 2006, mailed on Aug. 1, 2006 in Japanese Patent Application No. 2002-149220 filed May 23, 2002.

* cited by examiner

*Primary Examiner*—Amir Alavi
(74) *Attorney, Agent, or Firm*—Oliff & Berridge, PLC

(57) ABSTRACT

An image processing device for compressing image data using conversion to spatial frequency components may include a dividing section that divides the image data into a plurality of pixel blocks and computes spatial frequency components of each pixel block; a segmenting section that computes an intensity of predetermined high frequency components from information of the spatial frequency components and segments the image data into a first plane formed by including a pixel block having an intensity which is less than a predetermined threshold value and into a second plane formed by including a pixel block having an intensity which is equal to or greater than the threshold value; a compression section that executes compression for the first plane image data by applying quantization and entropy coding using the spatial frequency components information; and a run length compression section that executes run length compression of the second plane image data.

3 Claims, 5 Drawing Sheets

IMAGE PROCESSING DEVICE

BACKGROUND OF THE INVENTION

1. Field of the Invention

The present invention relates to an image processing device for compressing image data.

2. Description of the Related Art

In devices for handling image data, it is common practice to compress image data in order to reduce data transfer load and lower data storage requirements. In order to compress image data efficiently, it is important to select the compression method and compression parameters to match the characteristics of the image data. For example, in the case of an image having comparatively low frequency spatial frequency components, such as a natural image, a JPEG (Joint Picture Experts Group) compression method is applied, while run length compression is applied to sections having consecutive characters or the like.

Most images are not made up of sections having only one characteristic, such just natural images or just text, and are in fact normally a combination of natural images and text. For this reason, if the same compression is carried out for all of the data, compression efficiency is lowered and quality is degraded. For example, if image data containing natural images and text is compressed using JPEG, it is possible to carry out appropriate compression for the natural image section, but the quality of the text section is degraded and compression efficiency is lowered.

There are therefore techniques to segment image data into natural image section planes and text section planes and apply appropriate compression for each plane. In this case, segmentation into planes discriminates text regions using edge detection or presence or absence of restricted colour. Examples of such techniques are disclosed in Japanese Patent Laid-open No. Hei. 7-236062. A technique for segmenting into planes based on results of encoding is also disclosed in Japanese Patent Laid-open No. Hei. 11-168633.

SUMMARY OF THE INVENTION

However, with the above described image processing techniques, overall processing load is increased because processing that is unrelated to the compression is used when segmenting into planes, and encoding processing is reiterated. Also, segmentation processing does not always bring about an appropriate result, which means that the increase in load is not sufficiently compensated for by the extent of improvement in compression.

The present invention has been conceived in view of the above described situation, and an advantage of the present invention is that it provides an image processing device that can sufficiently improve compression with a low processing load.

In order to achieve the above described advantage, the present invention provides an image processing device, for performing compression of image data using multistage processing, comprising segmenting means for segmenting image data into a plurality of planes using results of pre-processing, and means for carrying out respective post-processing using results of pre-processing for the image data segmented into planes.

Here, the means for carrying out post-processing can selectively apply different processing for each plane. Also, the means for carrying out post-processing may apply processing using different processing parameters for each plane.

According to the present invention, there is also provided an image processing device for performing compression of image data using prediction encoding, comprising means for sequentially selecting noted pixels from image data that was subject of compression, and determining whether or not the noted pixel can be predicted from information for other pixels, segmenting means for segmenting the image data into a first plane including a set of pixels determined to be predictable, and a second plane including a set of pixels determined not to be predictable, and means for applying compression using prediction encoding for image data of the first plane.

According to the present invention there is also provided an image processing device for carrying out compression of image data using conversion to spatial frequency components, comprising means for converting image data to spatial frequency components, segmenting means for segmenting image data into a plurality of planes based on results of the conversion to spatial frequency components, and means for applying compression to at least one of the plurality of planes using the results of the conversion to spatial frequency components.

According to another aspect of the present invention, there is also provided an image processing device for compressing image data using repeatability of data patterns, comprising means for executing pattern matching for image data, segmenting means for segmenting image data into a plurality of planes based on results of the pattern matching, and means for applying compression to at least one of the plurality of planes using pattern repeatability.

In order to solve the above described problems, the present invention also provides an image data generating method, for generating image data compressed using multistage processing, comprising a step of segmenting image data into a plurality of planes using results of pre-processing, and a step of carrying out respective post-processing for the image data segmented into planes using results of the pre-processing.

In order to solve the above described problems of the related art, the present invention also provides a program for carrying out compression of image data through multistage processing using a computer, for causing execution on the computer of a procedure for segmenting image data into a plurality of planes using results of pre-processing, and a procedure for carrying out respective post-processing for the image data segmented into planes using results of the pre-processing.

DESCRIPTION OF THE PREFERRED EMBODIMENTS

Figure 1:
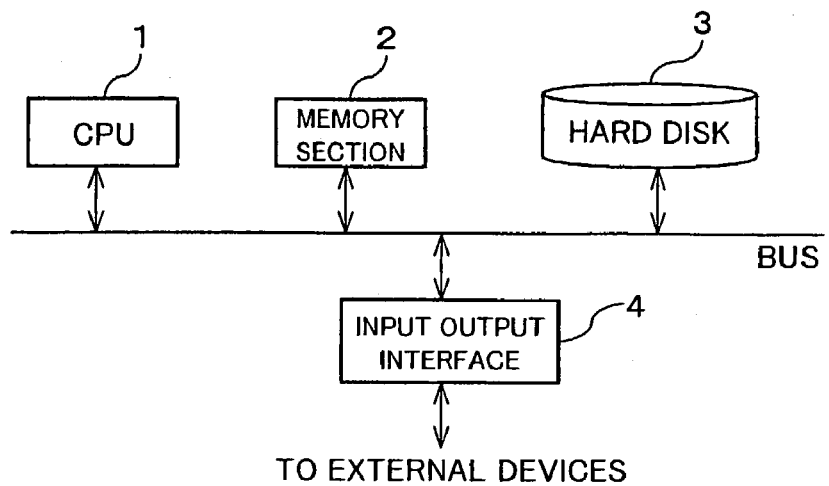
FIG. 1 is a structural block diagram of an image processing device of an embodiment of the present invention.

An embodiment of the present invention will now be described with reference to the drawings. An image processor of the embodiment of the present invention is a general computer, and as shown in FIG. 1, comprises a CPU 1, a memory section 2, a hard disk 3 and an input/output interface 4. The CPU 1 executes programs stored on the hard disk 3, and implements the various means of the present invention. Specific processing contents for this CPU 1 will be described in detail later. The memory section 2 acts as working memory for the CPU 1. The hard disk 3 stores programs executed by the CPU 1. The input/output interface 4 outputs image data and user instructions input from the outside to the CPU 1. Also, image data that has been subjected to compression is output to the outside in accordance with instructions input from the CPU 1.

Figure 2:
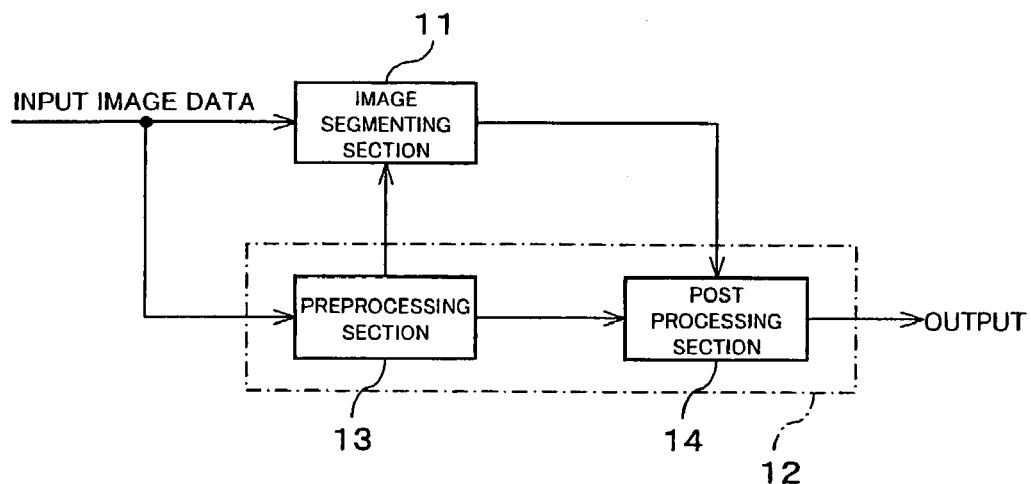
FIG. 2 is a functional block diagram showing an overview of an image compression program executed by a CPU 1.

Next, an image processing program stored on the hard disk 3 and executed by the CPU will be described. As shown in FIG. 2, for example, this image processing program is basically made up of an image segmenting section 11 and a compression section 12, and the compression section 12 includes a pre-processing section 13 and a post-processing section 14. The pre-processing section 13 executes processing for the previous stage of compression for input image data, and the results are output to the image segmenting section 11. The image segmenting section 11 segments the input image data into a plurality of planes, generates image data for each plane and outputs the data to the post-processing section 14 of the compression section 12. The post-processing section 14 executes specified processing on image data of the input plurality of planes to generate compressed image data. It is not necessary to perform compression for image data of all the planes, and it is possible to perform compression for image data of at least one plane.

In this embodiment, it is possible to use various compression methods for this compression. In the following, the case of using prediction encoding will be described as a specific example.

[Compression Program Using Prediction Encoding]

Figure 3:
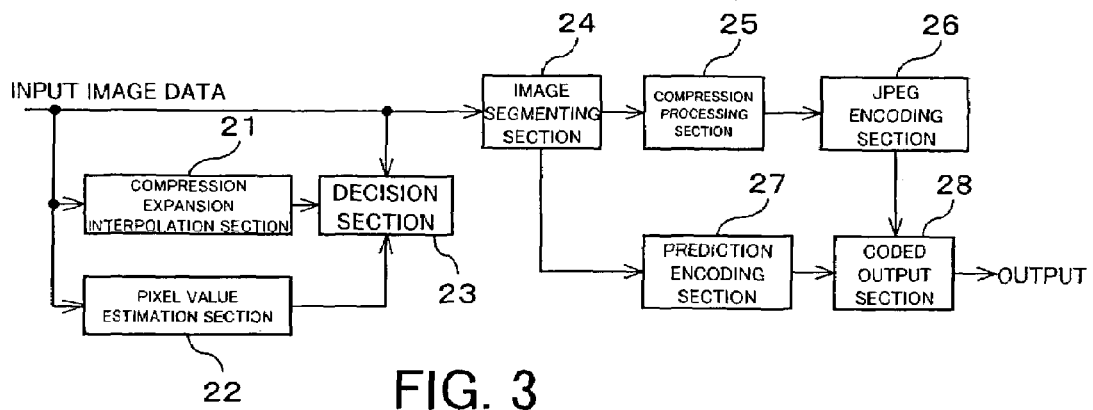
FIG. 3 is a functional block diagram showing one example of an image compression program executed by a CPU 1.

A compression program using prediction encoding is shown as a functional block diagram in FIG. 3, and includes a compression expansion interpolation section 21, a pixel value prediction section 22, a decision section 23, an image segmenting section 24, a reduction processing section 25, a JPEG encoding section 26, a prediction encoding section 27, and a code output section 28. Here, processing carried out by the compression expansion interpolation section 21 and the pixel value prediction section 22 is equivalent to the pre-processing of the present invention, while processing carried out by the reduction processing section 25 and JPEG encoding section 26, and the prediction encoding section 27 is equivalent to the post-processing of the present invention.

The compression expansion interpolation section 21 receives input of image data that is the subject of processing, carries out compression or expansion processing on the image data to convert the resolution, obtains a value for each pixel of the image data after resolution conversion using a 4-point linear interpolation method (bi-linear interpolation method) and outputs the values as interpolated image data.

The pixel value prediction section 22 receives input of image data that is the subject of processing, sequentially selects each pixel of the image data as noted pixels, and determines whether prediction possible for each of the selected noted pixels. Information as to whether prediction is predictable for each pixel constituting the image data is then output as prediction evaluation information. Here, as prediction evaluations there are determination results as to whether or not it is possible to predict values for the noted pixels from values of pixels around the noted pixels. In more detail, it is respectively determined whether or not it is possible to predict a noted pixel (is predictable) from already selected pixels (as previous noted pixels) among pixels around the noted pixel, and whether or not it is possible to predict the noted pixel from pixels selected after that (selected as a noted pixel later on) (is Backward Predictable), and then prediction evaluation information is obtained for these "is predictable" and "is backward predictable" conditions.

The decision section 23 receives input of each pixel value of image data after resolution conversion, and prediction evaluation information for each pixel, from the compression expansion interpolation section 21 and the pixel value prediction section 22 respectively, and generates information for determining planes to which each pixel will belong (plane designation information) using specified conditions based on these input values. Specific examples of the specified conditions used here will be given later. Also, plane designation information output by the decision section 23 represents whether the pixel belongs to a first plane to be subjected to JPEG encoding later, or a second plane to be subjected to prediction encoding, and is, for example, mask image data with the same size as the image data and a depth (number of bits per single pixel) of "1", or mask image data such that pixels equivalent to pixels to belong to the first plane become "1" while pixels equivalent to pixels to belong to the second plane become "0".

The image segmenting section 24 selectively outputs each pixel constituting image data to either the reduction processing section 25 or the prediction encoding section 27 based on plane designation information output by the decision section 23. Specifically, this image segmenting section 24 respectively generates, in the following order, image data to be processed by the prediction encoding section 27 (first plane image data) and image data to be processed by the reduction processing section 25 (second plane image data).

That is, the image segmenting section 24 ensures that there are two regions for storing image data of the same size as the input image data. One of these two regions is the first plane image data and the other is the second plane image data. The image segmenting section 24 therefore sequentially selects each pixel of the input image data and acquires the value of the selected pixel as a set value. Values of pixels in the mask image data, corresponding to the pixels, are then referenced. When the value is "0", a valu of a corresponding pixel in the first plane image data is made the set value. Also, if a corresponding pixel in the mask image data is "1", the value of a corresponding pixel in the second plane image data is set to the set value. Accordingly, of the pixels included in the first plane image data, parts equivalent to a region where pixel values in mask image data become "1" are kept at a value initially set whe ensuring the region. These parts are called "don't care" the following. Of pixels included in the second plane image data, those located in parts equivalent to a region where pixel values in mask image data become "0" are similar calle "don't care".

In this way, the first plane image data formed by including the image portion equivalent to a region where values of pixels in the mask image data are "0", and th second plane image data formed by including the image portion equivalent to a region where values of pixels in the mask image data are "1", are generated, and these data ar respectively used by the reduction processing section 25 and the prediction encoding section 27.

The reduction processing section 25 performs compression of the second plane image data and carries out resolution conversion. Reduction processing carried out here is the same as reduction processing carried out in the compression expansion interpolation section 21. The JPEG encoding section 26 carries out JPEG encoding processing for the image data that has been subjected to reduction processing, performs compression on the image data and outputs the resultant data.

The prediction encoding section 27 performs compression of the first plane image data using prediction encoding, and outputs results of the compression. The code output section 28 generates compression image data made up including results of compression input from the JPEG encoding section 26 and results of compression input from the prediction encoding section 27, writes the data to the hard disk 3 or outputs the data to the outside via the input output interface 4. Processing for each of these sections is actually executed by the CPU 1.

Figure 4:
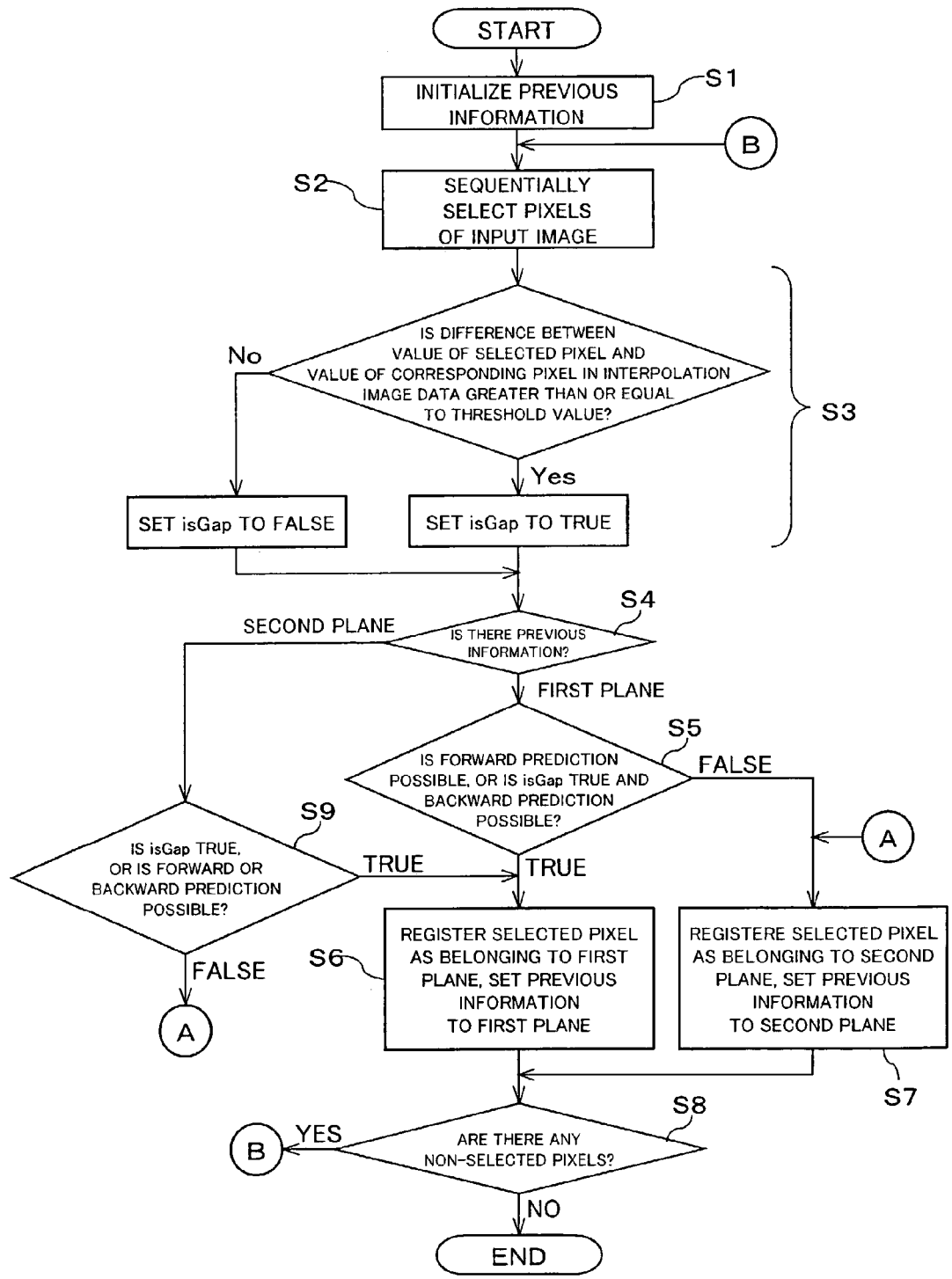
FIG. 4 is a flowchart showing one example of specific processing content for a decision section.

An example of specific conditions when determining the plane to which each pixel belongs in the decision section 23 will now be described. The decision section 23 is realized by the processing as shown in FIG. 4, and the planes are determined by this processing. If the CPU 1 commences this processing for the decision section 23, first of all information (immediately previous information) representing what plane the pixel processed immediately previous belongs to is initialized, and set to a predetermined value (for example, "first plane") (S1). Also, mask image data havin the same size as the input image data and a depth of 1 is generated and stored in the memory section 2. Next, pixels are sequentially selected from the input image data (S2). The order for selection of pixels here is the same as the order for selecting noted pixels in the processing for the pixel value prediction section 22.

Next the CPU 1 compares the values of the selected pixels with values of corresponding pixels in the interpolated image data, and Boolean values representing whether or not a difference between the two is less than a predetermined threshold value are generated as gap information (isGap) (S3). It is then determined whether or not information (immediately previous information) stored as the plane to which the pixel processed immediately before belongs is the "first plane" or the "second plane" (S4), if it is the "first plane" a Boolean value fo isPredictable || (isGap && isBackwardPredictable) is calculated using the gap information (isGap) generated in process S3, and isPredictable and isBackwardPredictable for the selected pixels, as the above described specified conditions, and it is checked whether this Boolean value is true or false (S5). Here, the symbol "||" means "OR" and the symbo &&" means "AND", and the content inside brackets is calculated first Notation with these symbols is widely used in notation such as the C language.

If the Boolean value calculated in processing of S5 is true, the CPU 1 determines that the plane to which the selected pixel belongs is "first plane", sets th corresponding pixel of the mask image data to "1" and s s the immediately previous information to "first plane" (S6) If the Boolean value calculated in the processing of S5 is false, it is determined that the plane to which the selected pixel belongs is the "second plane", the corresponding pixel of the mask image data is set to "0" and s s the immediately previous information to "second pla e" (S7). After the plane to which the selected pixel belongs has been decided in process S6 or process S7, it is checked whether or not there are unselected pixels (S8), and if there are unselected pixels (Yes), processing returns to S2 so as to select the pixels (B). On the other hand, if there are no unselected pixels (NO), the mask image data stored in the memory section 2 is output as plane designation information and processing terminates.

In process S4, if the immediately previous information is "second plane", the CPU 1 calculates a Boolean value for isGap && (ispredictable || isBackwardPredictable) using the gap information (isgap) generated in process S3, and isPredictable and isBackwardPredictable for the selected pixels, as the above described specified conditions, and it is checked whether this Boolean value is true or false (S9). If this value is true, processing moves to the process S6. If the value is false in S9, processing moves to S7 (A).

If the pixel processed immediately previously belongs to the second plane, the processing for the decision section 23 of this embodiment determines that the pixel belongs to the first plane if there is predictability, even if the gap information is true (this is equivalent to the case where the pixel in the image data is equivalent to an edge portion), and determines that the pixel belongs to the second plane if there is no predictability, even if the gap information is true. Also, if the pixel processed immediately previously belongs to the first plane, if there is predictability it is determined that the pixel belongs to the first plane based on the already processed pixels (among those, they can be made to belong to the first plane), and if, with the gap information true, and based on pixels processed afterwards, there is predictability, it is determined that the pixel belongs in the first plane. The latter is done because it is determined that the pixel is located at the end (upper left end) of a pixel set belonging to the first plane. Logical operations carried out in processes S5 and S9 shown here, and Boolean values appearing in these processes, are only working examples, and it is also possible to use other values an operations.

A characteristic of the processing of the decision section 23 of this embodiment is that decision results for the immediately previous pixel are used. This means that the bad practice of there being multiple isolated points in the mask image data thus reducing compression efficiency of the mask image data is prevented.

[Further Example of Conditions for Determination in the Decision Section 23]

Here, the plane to which each pixel belongs is determined using not only gap information calculated based on interpolated image data input from the compression expansion interpolation section 21 and input image data, but also using information about whether prediction is possible. However, it is also possible to carry out simplified processing where only the gap information is used and it is determined that the pixel belongs in the first plane if the gap information is greater than or equal to a predetermined threshold value, and it is determined that the pixel belongs in the second plane if the gap information less than the threshold value. This is decision processing using prediction encoding for cases where degradation due to compression expansion interpolation is large. Similarly, it is possible to determine the plane to which each pixel belongs using only predictability.

[Operation]

Next, operation of an image processing device of this embodiment will be described. The CPU 1 executes compression expansion interpolation processing for the input image data and stores the interpolated image data in the memory section 2. The CPU also checks whether or not each pixel can be forwardly or backward predicted with respect to input image data, and for each pixel, associated information related to forward predictability and backward predictability is stored in the memory section 2.

The CPU 1 executes the processing shown in FIG. 4 to generate plane designation information indicating which of the first plane or the second plane each pixel belongs to and stores this information in the memory section 2. This plane designation information is implemented as, for example, mask image data. The CPU 1 applies mask image data to the input image data, segments into first plane image data, made up of an input image data pixel set corresponding to pixels in the mask image data that are "1", and second plane image data, made up of an input image data pixel set corresponding to pixels in the mask image data that are "0", and stores the respective image data in the memory section 2.

Figure 5:
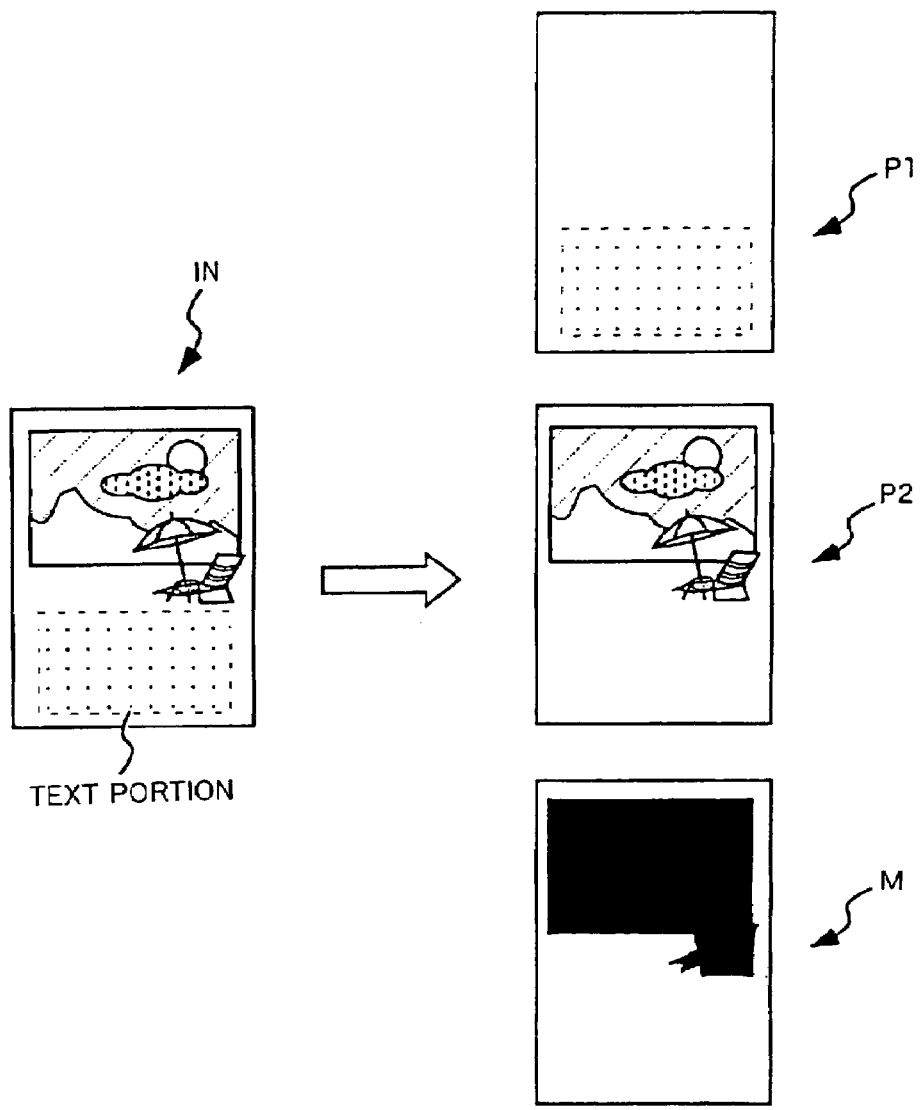
FIG. 5 is an explanatory drawing showing an overview of image data of each plane and mask image data appearing during processing of the image processing device of the present invention.

Specifically, as shown in FIG. 5, first plane image data P1 to be subjected to prediction encoding, second plane image data P2 to be subjected to JPEG encoding and mask image data M representing which plane each pixel belongs to are generated from input mage data IN including a natural image portion N and a text image portion T. Normally, the mask image data M shown in FIG. 5 is black (0) only for a region enclosed by the outline of the natural image, but as a result of the above described processing, by determining which plane a pixel belongs to a black (0) region continues further to the upper right side of the drawing (pixel scanning direction) from the outline corresponding to use of the state of the immediately previous pixel.

The CPU 1 then executes prediction encoding processing for the first plane image data and stores the results in the memory section 2. On the other hand, reduction processing is carried out for the second plane image data, followed by JPEG encoding, and the results are stored in the memory section 2. In this way the CPU combines and outputs the prediction encoded image data, the image data after JPEG encoding and the mask image data. It is also possible to carry out compression such as run length compression for the mask image data.

Here, the compression expansion interpolation processing and processing to check whether or not prediction is possible are respectively compression processing, that is post-processing, and processing to acquire information used when carrying out prediction encoding processing. With this embodiment, since results of originally required processing are used in processing to segment the image data into planes, increase in overall load of image compression processing is only slight, and it is possible to achieve segmentation into planes and to sufficiently improve compression. It is also possible to use results of compression expansion interpolation processing in the processing of the reduction processing section 25, and to use processing results of the pixel value prediction section 22 in the processing of the prediction encoding section 27.

For image data that has been subjected to compression in this way, decoding processing is carried out corresponding to the prediction encoding for the section where first plane image data has been compressed, and decoding processing corresponding to JPEG encoding and expansion processing corresponding to the compression is carried out for the section where second plane image data has been compressed. Decoded image data for each plane is combined using mask image data (using decoding when this has been encoded), and the original image data is reproduced.

[Processing Before Prediction Encoding]

As processing for the prediction enclosing section 27 carried out by the CPU 1, it is possible to carry out the following processing before prediction encoding. Specifically, in order to carry out prediction encoding of the first plane image data, if a difference in value between a previously selected pixel and the currently selected pixel, when each pixel of the image data is being selected, is smaller than a specified threshold value, the CPU 1 makes the value of the currently selected pixel to the same value as the previously selected pixel. In this case, it is possible to carry out processing such as MTF (Move-to-Front) estimation (estimation for compressing depending on how long before a pixel of the same value was processed) or error diffusion in order to prevent image quality degradation, to simplify processing this processing is not absolutely necessary.

[Compression Program Using Conversion to Spatial Frequency Components]

So far the case of using prediction encoding has been given as an example of a compression method, but as well as this it is also possible to carry out similar processing in the case where conversion to spatial frequency components is used or where repeatability of data patterns is used, so these type of situations will be described in the following.

Figure 6:
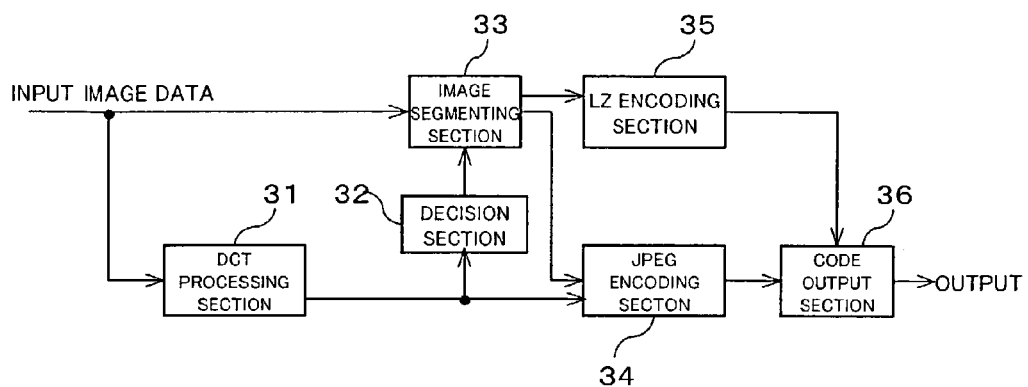
FIG. 6 is a functional block diagram showing another example of an image compression program executed by a CPU 1.

First of all, the case of using conversion to spatial frequency components will be described. As shown in FIG. 6, a program to be executed by the CPU 1 in this case includes a DCT processing section 31, a decision section 32, an image segmenting section 33, a JPEG encoding section 34, an LZ (Lampel-Ziv) encoding section 35 and a code output section 36.

The DCT (discrete cosine transform) processing section 31 divides input image data up into, for example, pixel blocks of 8×8, and calculates a spatial frequency component for each pixel block. The decision section 32 calculates strength of a specified high frequency component from information of the spatial frequency components input from the DCT processing section 31, plane designation information is generated such that if this strength is smaller than a predetermined threshold value the pixels belonging to that pixel block are set as belonging to the first plane, while otherwise pixels belonging to that pixel block are set as belonging to the second plane, and this information is output to the image segmenting section 33.

The image segmenting section 33 receives input of plane designation information from the decision section 32, and selectively outputs each pixel of the input image data to either the JPEG encoding section 34 or the LZ encoding section 35 based on this plane designation information. Specifically, image data (first plane image data) made up from a subset of pixels belonging to the first plane are output to the JPEG encoding section 34, and image data (second plane image data) made up from a subset of pixels belonging to the second plane are output to the LZ encoding section 35.

The JPEG encoding section 34 executes JPEG compression for the first plane image data and outputs the results to the code output section 36. The LZ encoding section 35 executes LZ compression for the second plane image data and outputs the results to the code output section 36. Here, LZ compression is carried out using repeatability of data patterns included in the image data, and the actual content is widely known and so will not be described in detail. The code output section 36 generates data including JPEG compressed image data and LZ compressed image data, and outputs this as image data of the compression result.

The JPEG encoding section 34 also uses information of the spatial frequency components generated in the DCT processing section 31 to perform quantization and entropy coding processing. Specifically, calculation results from the DCT processing section are used in both the segmentation processing by the decision section 32 and the image segmenting section 33, and the JPEG compression by the JPEG encoding section 34. Here, processing by the DCT processing section 31 is equivalent to pre-processing, and processing by the JPEG encoding section 34 is equivalent to post-processing.

[Compression Program Using Repeatability of Data Patterns]

Figure 7:
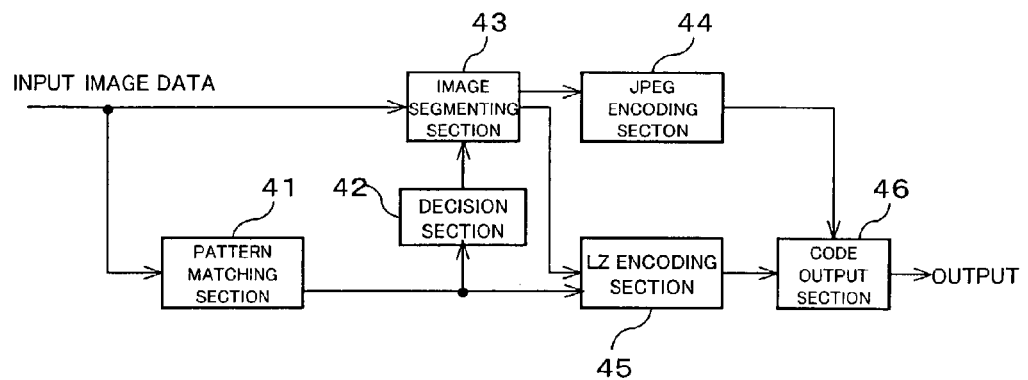
FIG. 7 is a functional block diagram showing yet another example of an image compression program executed by a CPU 1.

A case of using repeatability of data patterns will also be described. A program to be executed by the CPU 1 in this case comprises a pattern matching section 41, a decision section 42, an image segmenting section 43, a JPEG encoding section 44, an LZ encoding section 45 and a code output section 46, as shown in FIG. 7.

The pattern matching section 41 divides the input image data up into, for example, 8×8 pixel blocks, checks pixels in each pixel block while selectively selecting pixels, and checks whether or not there is a string of pixels appearing repeatedly as a pattern in the pixel block. Here, if there is a string of pixels appearing repeatedly as a pattern information specifying the pattern and information specifying the position where the pattern appears are output.

The decision section 42 generates plane designation information such that if a string of pixel values appearing repeatedly as a pattern is found by the pattern matching section 41, (if the pattern matching section 41 outputs information specifying a pattern etc.) the pixels in the pixel block are set as pixels belonging to the first plane, and otherwise sets the pixels in the pixel block as belonging to the second plane, and outputs the plane designation information to the image segmenting section 43.

The image segmenting section 43 receives input of the plane designation pattern from the decision section 42, and selectively outputs each pixel of the input image data to either the LZ encoding section 45 or the JPEG encoding section 44 based on this plane designation information. Specifically, image data made up from a subset of pixels belonging to the first plane (first plane image data) are output to the LZ encoding section 45, and image data made up from a subset of pixels belonging to the second plane (second plane image data) are output to the JPEG encoding section 44.

The JPEG encoding section 44 executes JPEG compression for the second plane image data and outputs the results to the code output section 46. The LZ encoding section 45 executes LZ compression for the first plane image data and outputs the results to the code output section 46. The code output section 46 generates data made up to contain image data that has been subjected to JPEG compression and image data that has been subjected to LZ compression and outputs as compression result image data.

Here, the LZ encoding section 45 carries out encoding using information specifying a pattern and information specifying the position where the pattern appears, output by the pattern matching section 41. Specifically, here processing by the pattern matching section is equivalent to pre-processing and processing by the LZ encoding section is equivalent to post-processing.

[Pixel Filling]

As has already been described, void (don't care) pixels are included in the first plane image data and the second plane image data generated by the image segmenting sections 24, 33 and 43. These void pixels can either be left as they are or set to a predetermined value, but in any case, it is possible to set to a suitable value by carrying out the following processing.

Specifically, the image segmenting sections 24, 33 and 43 set values of void pixels of the image data in each plane depending on the compression method for image data of each plane. For example, in the case of using prediction encoding, void pixels in the image data of the plane subjected to prediction encoding are set to the same value as pixels processed immediately previously. In this way, it is possible to improve encoding efficiency using prediction encoding. Also, in the case of using JPEG encoding, values of void pixels are set to an average value of values of pixels surrounding the pixels. In this way it is possible to improve the efficiency of JPEG encoding.

According to the present invention, compression pre-processing is executed for image data, the image data are segmented into a plurality of planes based on results of the pre-processing, and, among the image data of each segmented plane, at least one is subjected to compression (post processing) following on from the pre-processing executed before, and compressed image data is generated and output. Accordingly, segmentation of image data is made possible without additional processing, increase in processing load is restricted and it is possible to improve compression efficiency.

What is claimed is:

1. An image processing device for compressing image data using conversion to spatial frequency components, comprising:
   a dividing section that divides the image data into a plurality of pixel blocks and computes spatial frequency components of each pixel block;
   a segmenting section that computes an intensity of predetermined high frequency components from information of the spatial frequency components and segments the image data into a first plane formed by including a pixel block having an intensity which is less than a predetermined threshold value and into a second plane formed by including a pixel block having an intensity which is equal to or greater than the predetermined threshold value;
   a JPEG compression section that executes JPEG compression for image data of the first plane by applying quantization and entropy coding using the information of the spatial frequency components; and
   a run length compression section that executes run length compression of image data of the second plane.

2. A method for compressing image data using conversion to spatial frequency components, comprising:
   dividing the image data into a plurality of pixel blocks and computing spatial frequency components of each pixel block;
   computing an intensity of predetermined high frequency components from information of the spatial frequency components and segmenting the image data into a first plane formed by including a pixel block having an intensity which is less than a predetermined threshold value and into a second plane formed by including a pixel block having an intensity which is equal to or greater than the predetermined threshold value;

executing JPEG compression for image data of the first plane by applying quantization and entropy coding using the information of the spatial frequency components; and executing run length compression of image data of the second plane.

3. A computer readable medium storing a program causing a computer to execute a process for compressing image data using conversion to spatial frequency components, the process comprising:

dividing the image data into a plurality of pixel blocks and computing spatial frequency components of each pixel block;

computing an intensity of predetermined high frequency components from information of the spatial frequency components and segmenting the image data into a first plane formed by including a pixel block having an intensity which is less than a predetermined threshold value and into a second plane formed by including a pixel block having an intensity which is equal to or greater than the predetermined threshold value;

executing JPEG compression for image data of the first plane by applying quantization and entropy coding using the information of the spatial frequency components; and executing run length compression of image data of the second plane.

* * * * *